(12) United States Patent
Wang et al.

(10) Patent No.: US 12,215,002 B2
(45) Date of Patent: Feb. 4, 2025

(54) EQUIPMENT FOR SELF-POSITIONING HANDLING OF ALUMINUM PROFILES FOR RAIL VEHICLE

(71) Applicants: QINGDAO UNIVERSITY OF TECHNOLOGY, Shandong (CN); QINGDAO HUANGHAI UNIVERSITY, Shandong (CN); GUOHUA (QINGDAO) INTELLIGENT PRECISION DRIVE CONTROL TECHNOLOGY RESEARCH INSTITUTE CO., LTD., Shandong (CN); QINGDAO JIMO QINGLI INTELLIGENT MANUFACTURING INDUSTRY RESEARCH INSTITUTE, Shandong (CN)

(72) Inventors: Xiaoming Wang, Qingdao (CN); Changhe Li, Qingdao (CN); Zhuang Shi, Qingdao (CN); Bo Liu, Qingdao (CN); Zongming Zhou, Qingdao (CN); Yun Chen, Qingdao (CN); Xiaowei Zhang, Qingdao (CN); Zafar Said, Sharjah (AE); Wenfeng Ding, Qingdao (CN); Yanbin Zhang, Qingdao (CN)

(73) Assignees: QINGDAO UNIVERSITY OF TECHNOLOGY, Shandong (CN); QINGDAO HUANGHAI UNIVERSITY, Shandong (CN); GUOHUA (QINGDAO) INTELLIGENT PRECISION DRIVE CONTROL TECHNOLOGY RESEARCH INSTITUTE CO., LTD., Shandong (CN); QINGDAO JIMO QINGLI INTELLIGENT MANFACTURING INDUCTRY RESEARCH INSTITUTE, Shandong (CN)

( * ) Notice: Subject to any disclaimer, the term of this patent is extended or adjusted under 35 U.S.C. 154(b) by 379 days.

(21) Appl. No.: 17/829,659

(22) Filed: Jun. 1, 2022

(65) Prior Publication Data
US 2023/0037336 A1 Feb. 9, 2023

(30) Foreign Application Priority Data
Aug. 5, 2021 (CN) .......................... 202110896947.5

(51) Int. Cl.
*B66C 17/06* (2006.01)
*B66C 1/44* (2006.01)

(52) U.S. Cl.
CPC .............. *B66C 17/06* (2013.01); *B66C 1/447* (2013.01)

(58) Field of Classification Search
CPC ......... B66C 17/06; B66C 17/04; B66C 1/447; B66C 1/427; B66C 1/28; B25J 15/0023;
(Continued)

(56) References Cited

U.S. PATENT DOCUMENTS 9,821,472 B2 * 11/2017 Saadat ................. B25J 15/0028
2007/0056922 A1 * 3/2007 Ciaburro ................. B66C 19/02
212/175

(Continued)

*Primary Examiner* — Glenn F Myers
(74) *Attorney, Agent, or Firm* — JCIPRNET

(57) ABSTRACT

Equipment for self-positioning handling of aluminum profiles for rail vehicle, including a handling and lifting mechanism, a steel beam fixed on and being driven to lift by the mechanism, 2-DOF spatial mechanisms fixed on the steel beam and mechanical clamping jaws fixed on a clamping jaw connecting seat; the 2-DOF spatial mechanisms includes a cylinder supporting seat, four connecting members on an outer ring of the cylinder supporting seat hinged respectively to four first connecting rods; wherein, two of the first rods (Continued)

are hinged to first ends of two ball joint connecting rods of which second ends are hinged to the clamping jaw connecting seat; the other two first rods are hinged to first ends of two second connecting rods of which second ends are hinged to the clamping jaw connecting seat; a piston rod of a cylinder center of the cylinder supporting seat driving the clamping jaw connecting seat.

9 Claims, 7 Drawing Sheets

(58) Field of Classification Search
CPC .. B25J 15/0028; B25J 15/0042; B25J 15/086; B25J 15/103
USPC .... 414/753.1, 625, 624, 618, 626, 561, 660; 212/332, 333, 334, 341, 203
See application file for complete search history.

(56) References Cited

U.S. PATENT DOCUMENTS

| | | | |
|---|---|---|---|
| 2015/0343631 A1* | 12/2015 | Martinez-Esponda | ................... B25J 15/0023 74/490.03 |
| 2017/0158469 A1* | 6/2017 | Schulte | ................ B66C 1/442 |
| 2019/0321984 A1* | 10/2019 | Yamazaki | .............. B25J 9/0093 |

* cited by examiner

EQUIPMENT FOR SELF-POSITIONING HANDLING OF ALUMINUM PROFILES FOR RAIL VEHICLE

CROSS-REFERENCES TO RELATED APPLICATIONS

This application claims priority benefits to Chinese Patent Application No. 202110896947.5, filed 5 Aug. 2021, the contents of which are incorporated herein by reference.

TECHNICAL FIELD

The present invention relates to the technical field of craft equipment, and specifically to equipment for self-positioning handling of aluminum profiles for rail vehicle.

BACKGROUND

At present, the latest body material used in mass production of high-speed rail transit vehicles is hollow extruded aluminum alloy profile. Due to the use of hollow extruded aluminum alloy profiles, the structure of car body has become very simple. This large truss-type hollow extruded aluminum alloy profile is placed in parallel and extends only in the longitudinal direction of the car body, which is then welded automatically and continuously.

For the handling of these large truss-type hollow extruded aluminum profiles, the overhead cranes with special lifting sling for long and large profiles are currently used to lift the profiles to the grinding stations. The wirerope of the overhead crane is in a state of irregular swaying during the lifting process, and the special lifting sling for long and large profiles also adopts a sling for the lifting of the large truss-type hollow extruded aluminum alloy profiles, which is also in a state of irregular swaying. Nylon blocks are installed on both sides of the profile to prevent damage during the lifting process. This way of lifting and transporting the profiles relies heavily on manual assistance to achieve the placement of the profiles and the installation and removal of the sling and nylon blocks. As the first step before grinding, assembling and welding in the car body manufacturing, the lifting device of the profile must meet the flexible lifting and realize the accurate placement after the lifting is completed, so that the lifting device of the profile can meet the intelligent transformation. In the existing lifting sling for long and large profiles, although it can meet the flexible lifting, this flexible lifting will produce the swing of x-axis, the movement of x-axis and the rotation degrees of freedom in the z-axis direction during the lifting process. Since it is lifting, the moving degrees of freedom in the x-axis direction cannot be restricted, and it may happen that the lifting is not under the horizontal condition, and thus the risk of deflection, overhead slip, etc. occurs. The existence of rotation degrees of freedom in z-axis direction will affect the longitudinal accuracy of profile placement, and the ratio of longitudinal to transverse length of aluminum profile for rolling stock is large, so the slight error of longitudinal accuracy will be magnified many times due to the excessive length of longitudinal length, resulting in the oxide film cannot be completely removed cleanly in the subsequent grinding, which human intervention is required. When the profiles are transported and placed to the assembly and welding stations, the longitudinal installation distance between the profiles cannot meet the requirement of equal distance because of the longitudinal accuracy. Eventually, the uniformity of the welding seam of the profile is affected, and in serious cases, when the train is running, there may huge loss of life and property caused by the insufficient structural strength of car body occurs.

To sum up, according to the assembly welding process sequence of the sidewall of high-speed rail transit vehicles, firstly, the handling device will carry the large truss-type hollow extruded aluminum alloy profile to the grinding fixture to complete the grinding process of groove, and then the profile being grinded well will be carried to the assembly welding station to complete the assembly and welding of the sidewall.

The handling device, as a first step of the assembly welding process, now uses a special profile lifting sling having three degrees of freedom during the lifting, wherein the movement of x-axis will cause the lifting not to be in a horizontal state, thus causing the risk of overhead slippage, and the degree of freedom of z-axis rotation caused by the swing of lifting belt (sling) will affect the longitudinal placement accuracy of the hollow extruded aluminum alloy profiles, and the excessive ratio of longitudinal to transverse length of the profile will cause the longitudinal accuracy of profiles to be enlarged, which will seriously affect the requirements of processing accuracy of automatic grinding device, and the requirements of automatic assembly welding. Therefore, due to this defect of the current lifting device, there may be very unfavorable to the automation and intelligent transformation of the subsequent processes, and seriously affects the grinding and welding accuracy.

SUMMARY

For solving the problems of the traditional lifting device, the present invention provides equipment for self-positioning handling of aluminum profiles for rail vehicle. The equipment for self-positioning handling of aluminum profiles for rail vehicle can automatically adjust a clamping angle and limit degrees of freedom that cause errors according to type of the profile, effectively avoiding the generation of longitudinal errors, and providing a reliable way to handle the profile for the subsequent grinding process and assembly welding process.

The present invention provides the following technical solutions:

the present invention provides equipment for self-positioning handling of aluminum profiles for rail vehicle, comprising a handling and lifting mechanism, a steel beam, two degrees of freedom (2-DOF) spatial mechanisms and mechanical clamping jaws; the steel beam is fixed on the handling and lifting mechanism and being driven to lift and drop by the handling and lifting mechanism; the 2-DOF spatial mechanisms is fixed on the steel beam, comprising a cylinder supporting seat, four connecting members are arranged on an outer ring of the cylinder supporting seat, and the four connecting members are respectively hinged to four first connecting rods; wherein, two of the first connecting rods are hinged to first ends of two ball joint connecting rods, and second ends of the two ball joint connecting rods are hinged to a clamping jaw connecting seat; the other two first connecting rods are hinged to first ends of two second connecting rods, and second ends of the two second connecting rods are also hinged to the clamping jaw connecting seat; a piston rod of a cylinder arranging at a center of the cylinder supporting seat may drive the clamping jaw connecting seat; the mechanical clamping jaw is fixed to the clamping jaw connecting seat.

The 2-DOF spatial mechanism, when ignoring the cylinder at the middle, is a 2-DOF mechanism in space. When adding the cylinder in as a driving member, the mechanism has only one degree of freedom, i.e., the degree of freedom of rotation in the x-axis direction.

As a further technical solution, the mechanical clamping jaw is a left-right symmetric structure, comprising a mounting base, large clamping jaws being hinged to both ends of the mounting base, a small clamping jaw being hinged at a first end of the large clamping jaw, a second end of the large clamping jaw is driven by a first cylinder fixed to the mounting base, and the small clamping jaw is driven by a second cylinder fixed to the large clamping jaw.

As further embodiments, the small clamping jaw is V-like shape, and a through-hole is provided in a middle position of the small clamping jaw, a first connecting shaft passing through the through-holes to connect the small clamping jaws located on the same side of the mounting base in series; each of two clamping ends of the small clamping jaw is also provided with the through-hole, and the clamping ends of the small clamping jaws located on the same side of the mounting base are connected in series by a second connecting shafts; moreover, there are rollers mounted on the second connecting shafts.

As further embodiments, the second cylinder is connected to a connecting rod, and the connecting rod driving the small clamping jaw.

As further embodiments, the two small clamping jaws are mounted at an end of each the large clamping jaw through the first connecting shaft.

As further embodiments, two the large clamping jaws are mounted on the first side of the mounting base; top ends of the two large clamping jaws are connected together by a fixing member; a plurality of bulges are provided on the fixing member, each the bulge is provided with a through-hole, the plurality of the bulges are connected in series by a third connecting shaft; each the large clamping jaw is driven by a separate first cylinder correspondingly.

As further embodiments, the mounting base comprises an upper cover plate and a base plate, a center of bottom end of the upper cover plate is provided with a cylinder, and shoulder blind holes are provided inside the cylinder; a central position of the base plate is cooperated with a shaft through a bearing, an upper part of the shaft is cooperated with the blind holes through a bearing, and a central part of the shaft is cooperated with a rotating member through a bearing, and a top surface of the rotating member is connected with two spherical members.

As further embodiments, the spherical members are connected to the third connecting shaft by means of a retractable connecting rod.

As further embodiments, the handling and lifting mechanism is connected to a hydraulic cylinder chain connector through a hydraulic cylinder, and the hydraulic cylinder chain connector is connected to a lifting connector through the chain. The hydraulic cylinder drives the hydraulic cylinder chain connector to move up and down when doing a main movement, and then due to the connection of the lifting connector and the chain, there is realized an up and down movement of the lifting connector, so as to realize the function of lifting, that is, to realize a movement on z-axis. The handling and lifting mechanism is also connected to a worm gear reducer through a drive motor, and then the worm gear reducer is connected to a travel gear. The rotation of the drive motor eventually drives the rotation of the travel gear, which cooperates with a rack mounted on a ground groove to realize the movement of the lifting mechanism of whole along the y-axis, thus realizing the effect of handling.

Further, the mechanical clamping jaw forms the large clamping jaw mechanism to implement a clamping work when the cylinder is doing the main movement. A supporting shaft at the end of the large clamping jaw acts as a fixed hinge support to form a slider linkage mechanism when a double-rod cylinder is doing the main movement, so as to achieve a purpose of being able to adjust a swing angle, thus satisfying the clamping of the two curved profiles, an upper side-beam profile and a window lower profile.

Beneficial Effects of the Present Invention

1. In the present invention, the 2-DOF spatial mechanism is used to replace the traditional lifting wire rope. Since there is only x-axis rotational degree of freedom in the 2-DOF spatial mechanism, a clamping jaw position adaptation can be carried out when a y-axis movement error of the handling device exists. Four the mechanical clamping jaws being arranged side by side on the steel beam can restrict the z-axis rotation of the aluminum alloy profile after clamping and grasping the aluminum alloy profile at the same time, thus avoiding the longitudinal error that may exist when the profile is placed.

2. The equipment for self-positioning handling of aluminum profiles for rail vehicle of the present invention, although do not limit the degree of freedom of the movement on the x-axis, the clamping force of the mechanical clamping jaws can ensure that the profiles do not slide relatively, effectively avoiding the safety risks arising from handling.

3. The equipment for self-positioning handling of aluminum profiles for rail vehicle of the present invention get rid of the traditional manual loading and installation, dismantling and dismantling, do not need manual assistance to place profiles, completely releasing manpower and realizing fully automatic grabbing of the profile from the material rack and placing it to the grinding station, reducing labor intensity and improving the speed of profile transport at the same time.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

In Figures: handling and lifting mechanism I-1, steel beam I-2, 2-DOF spatial mechanism I-3, mechanical clamping jaw I-4;

cylinder supporting seat I-3-1, connecting rod I-3-2, connecting rod I-3-3, connecting rod I-3-4, ball joint connecting rod I-3-5, clamping jaw connecting seat I-3-6, end hinge support of piston I-3-7, cylinder I-3-8;

upper cover I-4-1, shaft I-4-2, thrust ball bearing I-4-3, sleeve I-4-4, tapered roller bearing I-4-5, base plate I-4-6, rotating member I-4-7, bolts I-4-8, spherical member I-4-9, nut I-4-10.

end hinge connector of cylinder I-4-11, cylinder I-4-12, connecting rod I-4-13, spherical sub-connector I-4-14, cylinder hinge support I-4-15, large clamping jaw connecting seat I-4-16;

large clamping jaw I-4-17, sliding washer I-4-18, end positioning sleeve I-4-19, axial positioning sleeve I-4-20, insertion plate I-4-21, clamping jaw relative position fixing plate I-4-22, connecting shaft I-4-23;

end positioning sleeve I-4-24, short roller I-4-25, connecting shaft I-4-26, long roller I-4-27, pin I-4-28, small clamping jaw I-4-29, connecting rod support I-4-30, connecting rod I-4-31, double-rod cylinder I-4-32, connecting shaft I-4-33.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present disclosure. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

For the purpose of description, if the words "upper", "lower", "left", "right" appear in this application, they only means that they are consistent with the up, down, left and right directions of the drawings themselves, and does not limit the structure, but is only for the purpose of describing the invention and simplifying the description, and does not indicate or imply that the equipment or components referred to must have a specific orientation, be constructed and operated in a specific orientation, and therefore cannot be construed as a limitation of this application. In addition, the terms "first", "second", "third", "fourth" are used for descriptive purposes only and cannot be construed as indicating or implying relative importance.

Figure 1:
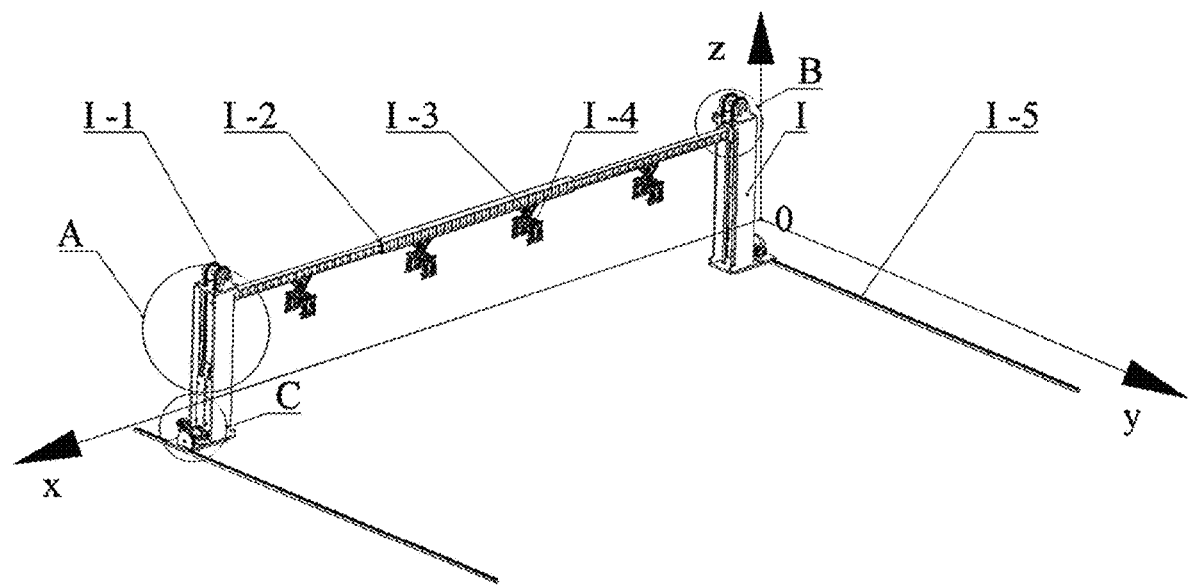
FIG. 1 is an axonometric drawing of equipment for self-positioning handling of aluminum profiles for rail transit vehicle I in an Embodiment 1 of the present invention.

FIG. 1 shows an axonometric drawing of equipment for self-positioning handling of aluminum profiles for rail transit vehicle I. As shown in the FIG. 1, accordingly, comprised a handling and lifting mechanism I-1, a steel beam I-2, 2-DOF spatial mechanisms I-3 and mechanical clamping jaws I-4. Between the handling and lifting mechanism I-1 and the steel beam I-2, between the steel beam I-2 and the 2-DOF spatial mechanisms I-3, between the 2-DOF spatial mechanisms I-3 and the mechanical clamping jaws I-4 are connected by screws. There are multiple 2-DOF spatial mechanisms I-3 provided on the steel beam I-2, and each the 2-DOF spatial mechanism I-3 is connected to the mechanical clamping jaw I-4; an overall composition of the equipment for self-positioning handling of aluminum profiles for rail vehicle I moves along a y-axis direction of a path of a rack I-5 laid on the ground to achieve the position of handling. and the 2-DOF spatial mechanisms I-3 are fixed on the steel beam, and the mechanical clamping jaws I-4 are fixed on the 2-DOF spatial mechanisms I-3, after being fixed, the whole structure is mounted on the handling and lifting mechanism I-1, and through the handling and lifting mechanism I-1 to achieve a vertical substantial lifting of the structure on a z-axis.

Further, the steel beam I-2 comprises two kinds of steel profiles with different sizes of cross-section. Wherein, the steel beam with larger size of cross-section is placed in a middle, and two ends are respectively the steel beam with smaller size of cross-section; a reason for the arrangement is to consider a bending deformation in material mechanics, thus reducing the error.

Figure 2:
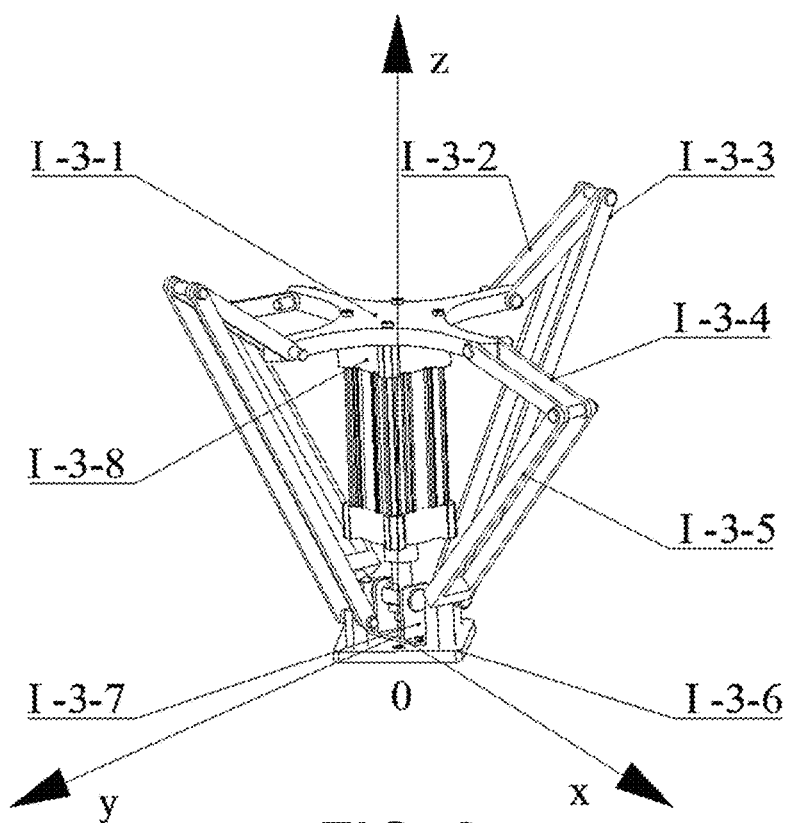
FIG. 2 is an axonometric drawing of a 2-DOF spatial mechanism I-3 in the Embodiment 1 of the present invention.

FIG. 2 shows an axonometric drawing of the 2-DOF spatial mechanism I-3. Accordingly, comprised a cylinder supporting seat I-3-1, two first connecting rods I-3-2, two second connecting rods I-3-3, two first connecting rods I-3-4, two ball joint connecting rods I-3-5, a clamping jaw connecting seat I-3-6 and a cylinder I-3-8; four connecting members of an outer ring of the cylinder supporting seat I-3-1 respectively are hinged with the four first connecting rods (In FIGS. 3 and 4, only two the first connecting rods are shown for example, i.e., the first connecting rod I-3-2 and the first connecting rod I-3-4); wherein, the two first connecting rods I-3-4 are hinged with the two ball joint connecting rods I-3-5, and the two first connecting rods I-3-2 are hinged with the two connecting rods I-3-3; the two ball joint connecting rods I-3-5 and the two connecting rods I-3-3 are hinged with the clamping jaw connecting seat I-3-6; the cylinder I-3-8 is provided at a center of the cylinder supporting seat I-3-1; a piston rod of the cylinder I-3-8 drives the clamping jaw connecting seat I-3-6. In order to ensure stability, the mechanism for self-positioning comprises two groups of symmetrical mechanisms, but when the spatial degrees of freedom are calculated, half of the two groups of symmetrical mechanisms can be taken, and the other half of the two groups of symmetrical mechanisms form virtual constraints. Therefore, there is enough to calculate the degrees of freedom of one of the groups of the self-positioning mechanisms. The cylinder supporting seat I-3-1 as a frame and the connecting rod I-3-2 form a rotating pair, the connecting rod I-3-2 and the connecting rod I-3-3 form the rotating pair, the cylinder supporting seat I-3-1 as the frame and the connecting rod I-3-4 form the rotating pair, the connecting rod I-3-4 and the ball joint connecting rod I-3-5 form the rotating pair, the connecting rod I-3-3 and the clamping jaw connecting seat I-3-6 with hinge support form the rotating pair, a lower end ball of the ball joint connecting rod I-3-5 and a ball pair connecting seat provided on the clamping jaw connecting seat I-3-4 form a spherical vice.

Excluding the imaginary constraints, the number of the members is 5, and the number of restrictions of five degrees of freedom is 5, and the number of restrictions of three degrees of freedom is 1. Therefore, the resulting degrees of freedom are calculated as:

solution: $n=5, P_5=5, P_3=1$, $$F = 6 \times n - 5 \times P_5 - 4 \times P_4 - 3 \times P_3 - 2 \times P_2 - P_1 = 6 \times 5 - 5 \times 5 - 1 \times 3 = 2$$

The calculation of the degrees of freedom here, when the cylinder I-3-8 is not considered, the degrees of freedom of the structure are 2, which are the moving degrees of freedom in the z-axis direction and the rotation degrees of freedom in the y-axis direction, respectively. When the cylinder I-3-8 is considered, the cylinder I-3-8 serves to precisely adjust the amount of movement in the z-axis direction, and is also used as a locking structure for a purpose of limiting the degrees of freedom.

Figure 3:
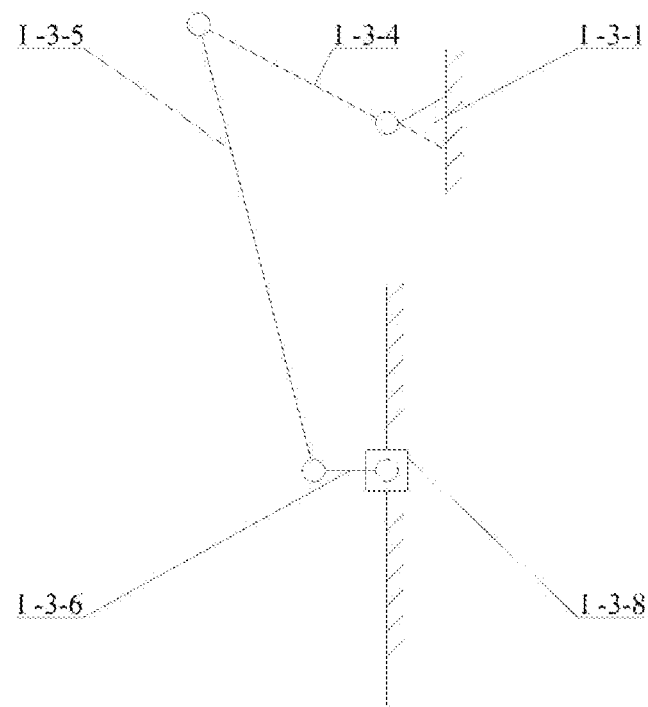
FIG. 3 is sketch a of a plane degrees of freedom simplified by the 2-DOF spatial mechanism I-3 in the Embodiment 1 of the present invention.
Figure 4:
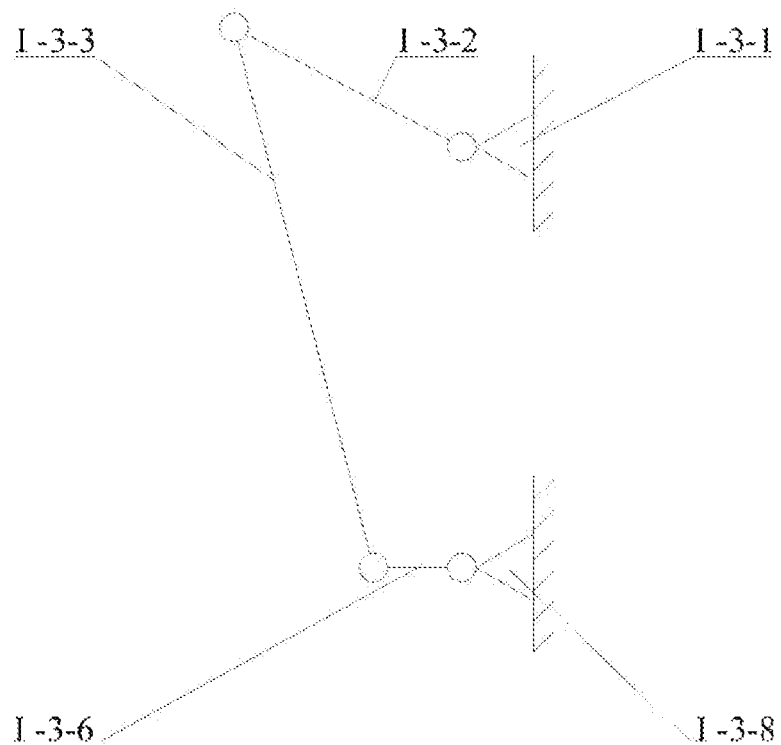
FIG. 4 is sketch b of the plane degrees of freedom simplified by the spatial 2-DOF spatial mechanism I-3 in the Embodiment 1 of the present invention.

FIGS. 3 and 4 respectively show sketches a and b of plane degrees of freedom simplified by the 2-DOF spatial mechanism I-3. As shown in FIG. 3, accordingly, there are simplified labeling of the corresponding devices. When the cylinder I-3-8 is as a passive part and only equivalents to a slider, the sketch of plane degree of freedom has 2 degrees of freedom. When the cylinder I-3-8 is mounted and as an active part, the moving degrees of freedom in the z-axis direction are also limited, leaving only the rotation degrees of freedom of the x-axis direction. As shown in FIG. 4, accordingly, there is the simplified labeling of the corresponding devices. When the cylinder I-3-8 is as the active part, when in fixed a certain stroke, equivalent to the position fixed, can be as the frame, the sketch of plane degree of freedom has 1 degree of freedom.

Therefore, accordingly, the 2-DOF spatial mechanisms I-3 always have the rotation degrees of freedom on x-axis. The existence of the degree of freedom of rotation of the x-axis is for the mechanical clamping jaw I-4 can have a degree of freedom of swing after the mechanical clamping jaw I-4 is mounted. Since the ratio of longitudinal and transverse length of the large truss type hollow extruded aluminum alloy profile is too large, it is inevitable that there will be errors. If the purely rigid mechanical clamping jaws I-4 are mounted directly on the steel beam I-2, then when there is an error in the longitudinal direction, or when there is an offset of the hollow extruded aluminum alloy profiles placed on the material rack, as the four mechanical clamping jaws I-4 are adopted to be arranged directly and rigidly on the steel beam I-2, then there will certainly be mechanical clamping jaws I-4 that are not completely clamped or not reliably clamped. Therefore, to realize that four of the mechanical clamping jaws I-4 being arranged can be completely reliable for clamping and handling, the existence of rotation degrees of freedom of x-axis is designed. So if there is the error in the longitudinal direction of the hollow extruded aluminum alloy profile, the mechanical clamping jaws I-4 can be adjusted by swinging to realize the tight clamping of the four mechanical clamping jaws I-4.

Figure 5:
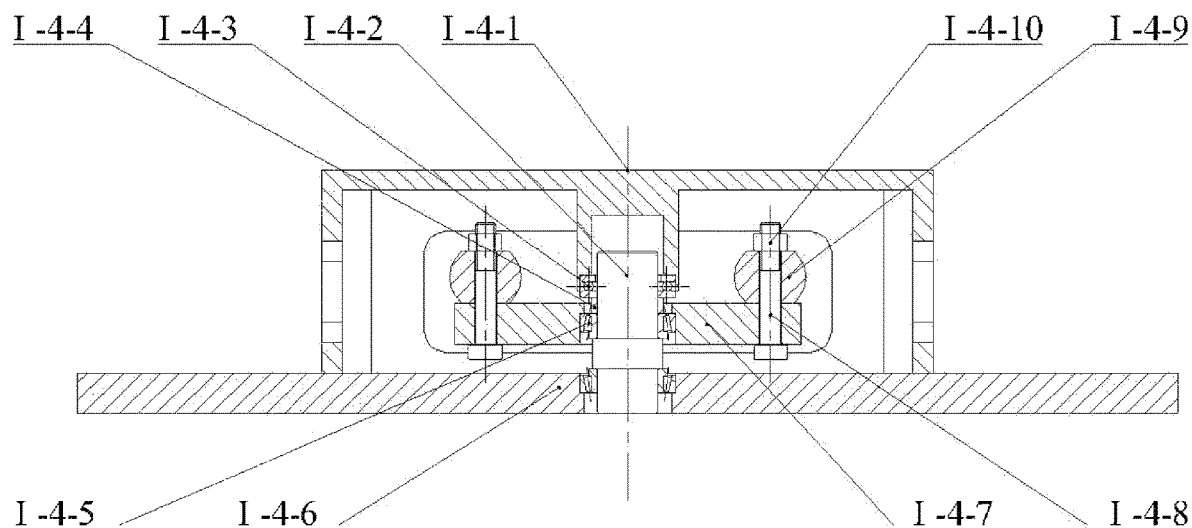
FIG. 5 is an assembly cutaway view of a mechanical clamping jaw I-4 in the Embodiment 1 of the present invention.

FIG. 5 shows an assembly cutaway view of the mechanical clamping jaw I-4. Accordingly, comprised an upper cover I-4-1, a shaft I-4-2, a thrust ball bearing I-4-3, a sleeve I-4-4, a tapered roller bearing I-4-5, a base plate I-4-6, a rotating member I-4-7, bolts I-4-8, a spherical member I-4-9 and nuts I-4-10; the upper cover I-4-1 is machined out of an cylinder, and the cylinder is machined out of shoulder blind holes, and the thrust ball bearing I-4-3 and the blind holes are matched by a base shaft system. The shaft I-4-2 and the thrust ball bearing I-4-3 are matched by a base hole system. A lower face of the thrust ball bearing I-4-3 is in contact with the sleeve I-4-4, and the sleeve I-4-4 is in contact with an inner ring of the tapered roller bearing I-4-5, and shoulder holes designed inside the rotating part I-4-7 and the tapered roller bearing I-4-5 are matched by the base shaft system. A shoulder is provided on a lower end of the shaft I-4-2 to locate the axial position, and a lower end of the shoulder and the other one tapered roller bearing I-4-5 are matched by the base hole system; the base plate I-4-6 is provided with shoulder holes to locate the axial position of the tapered roller bearing I-4-5, and the shoulder holes and the tapered roller bearing I-4-5 are matched by the base shaft system. The rotating member I-4-7 is connected to the spherical member I-4-9 by bolts I-4-8, and an end of the rotating member I-4-7 is fastened by nuts I-4-10.

Figure 6:
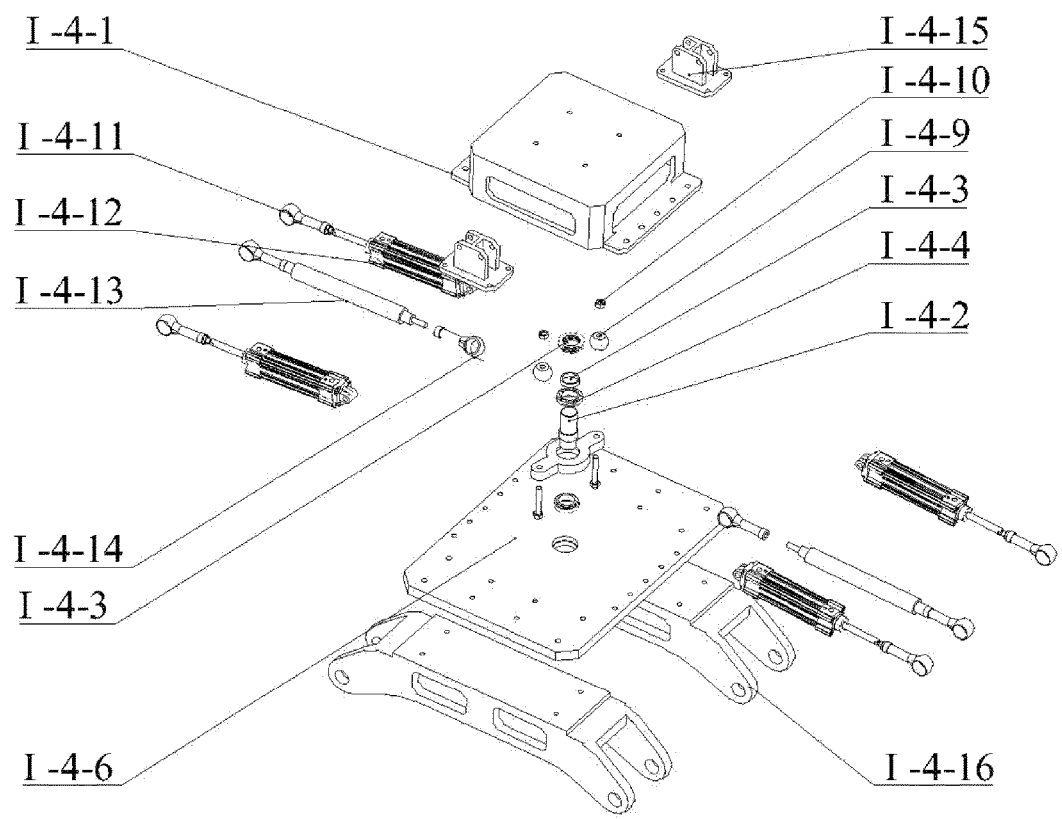
FIG. 6 is a local exploded view 1 of the mechanical clamping jaw I-4 in the Embodiment 1 of the present invention.

FIG. 6 shows a local exploded view 1 of the mechanical clamping jaw I-4. Accordingly, comprised the parts shown in the FIG. 5, and also comprised a cylinder end hinge connector I-4-11, and cylinder I-4-12, a connecting rod I-4-13, a spherical sub-connector I-4-14, an cylinder hinge support I-4-15 and a large clamping jaw connecting seat I-4-16.

The cylinder end hinge connector I-4-11 is connected to a head of a piston of the cylinder I-4-12 by thread. Two ends of the connecting rod I-4-13 are respectively mounted with the cylinder end hinge connector and the spherical sub-connector I-4-14 by threads, wherein a through hole of the cylinder end hinge connector I-4-11 mounted on the connecting rod I-4-13 is in the same axis with a through hole of the cylinder end hinge connector I-4-11 mounted on the head of piston of the cylinder I-4-12. The cylinder hinge support I-4-15 is mounted on the base plate I-4-6, and four the cylinders I-4-12 are mounted on both sides of two the cylinder hinge supports I-4-15 respectively; here, positions of the tail hinge supports of the cylinders I-4-15 are fixed by means of bolts and nuts. The large clamping jaw connecting seat I-4-16 is fixedly mounted on the base plate I-4-6 by structure of screws.

Figure 7:
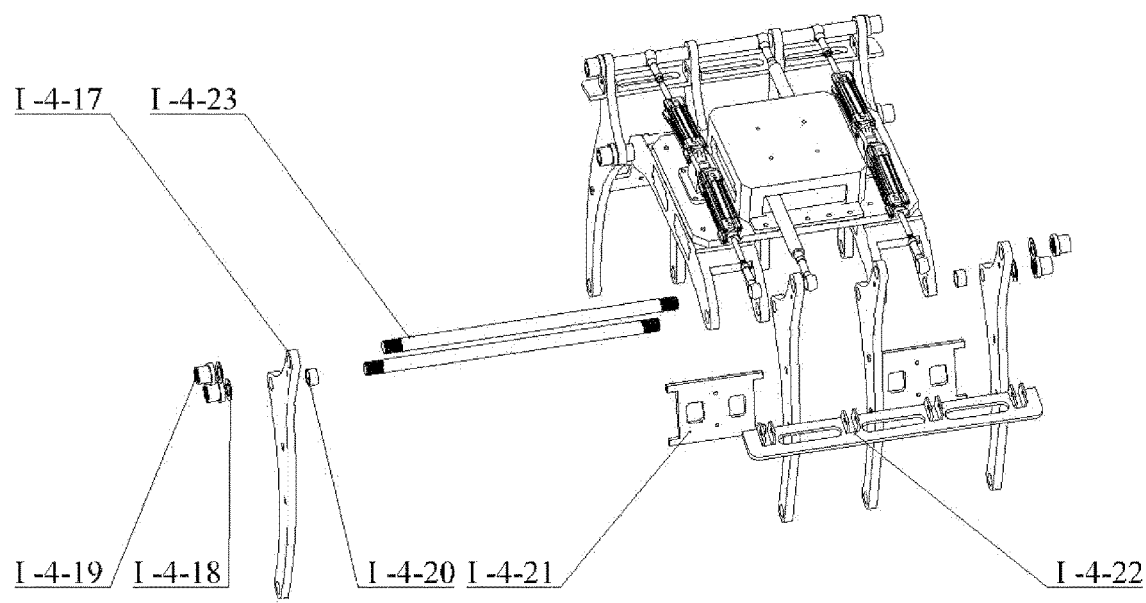
FIG. 7 is a local exploded view 2 of the mechanical clamping jaw I-4 in the Embodiment 1 of the present invention.

FIG. 7 shows a local exploded view 2 of the mechanical clamping jaw I-4. Accordingly, comprised the parts in the exploded view 1 of the mechanical clamping jaw I-4 of the FIG. 6, also comprised a large clamping jaw I-4-17, a sliding washer I-4-18, an end positioning sleeve I-4-19, an axial positioning sleeve I-4-20, an insertion plate I-4-21, a clamping jaw relative position fixing plate I-4-22 and a connecting shaft I-4-23.

A through-hole on the uppermost end of the large clamping jaw I-4-17 and the through-hole of the cylinder end hinge connector I-4-11 in the FIG. 6 realize a coaxial line clearance fit through the connecting shaft I-4-23, and the through-holes and the connecting shaft I-4-23 can slide relative to each other. A through-hole on the central part of the large clamping jaw I-4-17, the axial positioning sleeve I-4-20 and the through-hole of the large clamping jaw connecting seat I-4-16 in the FIG. 6 realize the coaxial line clearance fit through the connecting shaft I-4-23, and the through-holes and the connecting shaft I-4-23 can slide relative to each other. The insertion plate I-4-21 is mounted on between two the large clamping jaws I-4-17, and then a relative distance between the two clamping jaws I-4-17 is fixed by using the clamping jaw relative position fixing plate I-4-22. At this time, the axial position of the clamping jaws I-4-17 relative to the connecting shaft I-4-23 still needs to be fixed. The purpose of fixing the axial position of the large clamping jaw I-4-17 can be achieved by sleeving the sliding washers I-4-18 on outer sides of the two connecting shafts I-4-23, and then utilizing a fit assembling of the threaded structure of the end positioning sleeve I-4-19 and the threaded structure of the two ends of the connecting shaft I-4-23.

Figure 8:
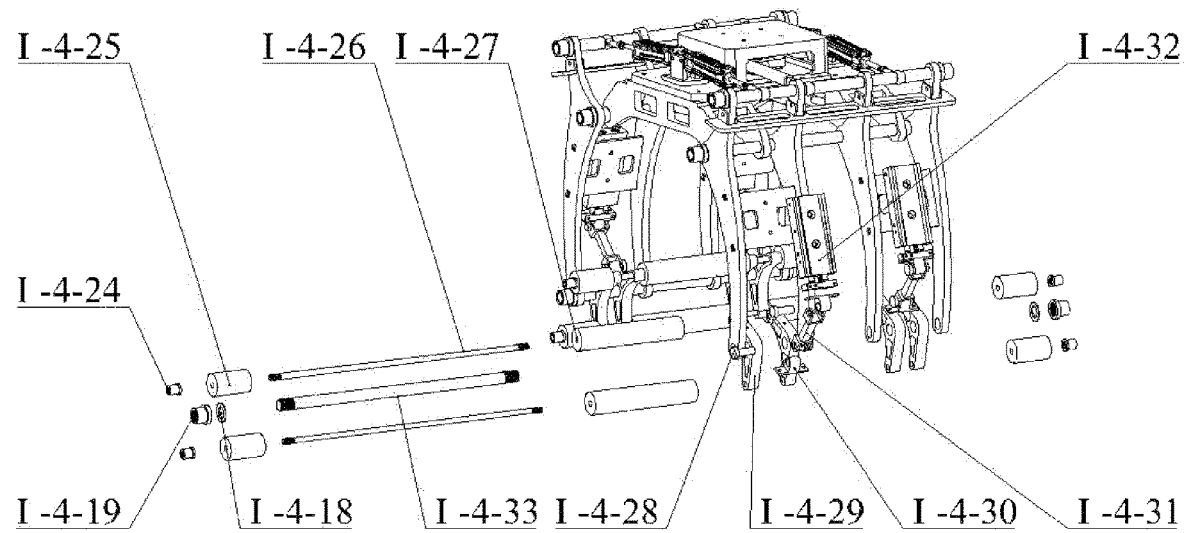
FIG. 8 is a local exploded view 3 of the mechanical clamping jaw I-4 in the Embodiment 1 of the present invention.

FIG. 8 shows a local exploded view 3 of the mechanical clamping jaw I-4. As shown in the Figure, accordingly, comprised the parts of the local exploded view 2 of the mechanical clamping jaw I-4 in the FIG. 7, also comprised an end positioning sleeve I-4-24, a short roller I-4-25, a connecting shaft I-4-26, a long roller I-4-27, pins I-4-28, small clamping jaws I-4-29, a connecting rod support I-4-30, a connecting rod I-4-31, double-rod cylinders I-4-32 and a connecting shaft I-4-33.

One of the double-rod cylinders I-4-32 is first threaded with the connecting rod support I-4-30, and the connecting rod support I-4-30 is connected with a first end of the connecting rod I-4-31; a second end of the connecting rod I-4-31 is connected with another connecting rod support through the pin I-4-28, and the connecting rod support is fixedly connected with two the small clamping jaws I-4-29 through threaded structure; the long roller I-4-27 is mounted between same coaxial line of through-holes on middle ends of two the small clamping jaws I-4-29, and the short roller I-4-25 is mounted on an outer end of the same coaxial line of the through-holes of two the small clamping jaws I-4-29, and an outer side of the short roller I-4-25 is positioned axially through the end positioning sleeve I-4-24. A through-hole on the lowermost end of the large clamping jaw I-4-17 and the through-hole on the middle of the small clamping jaw I-4-29 realize the coaxial line clearance fit through the connecting shaft I-4-33. The sliding washers I-4-18 are mounted at both ends of the connecting shaft I-4-23, then there is carried out a threaded fixed connection by using the end positioning sleeve I-4-19. It should be noted here that the roller is made of a nylon material, which is used to ensure the protection of the aluminum profile in the clamping process.

Figure 9:
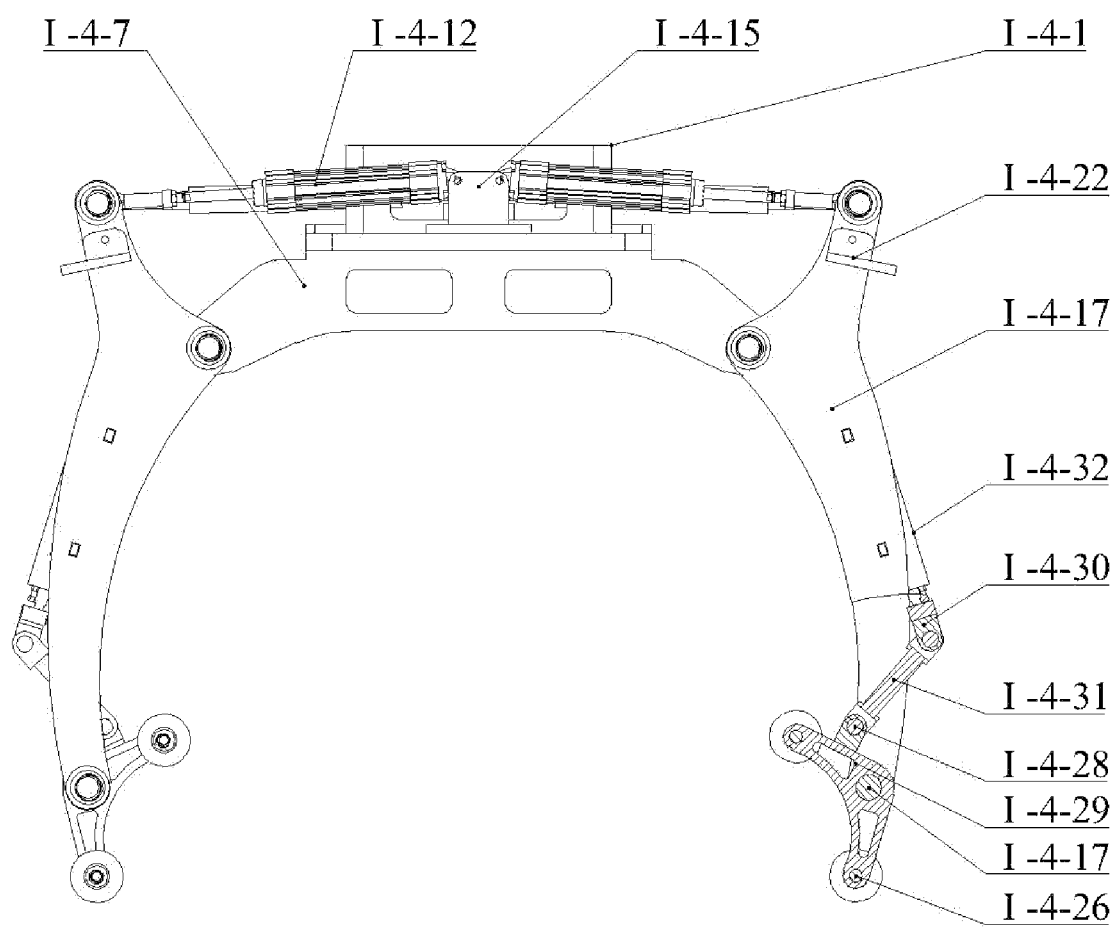
FIG. 9 is a local cutaway view of the mechanical clamping jaw I-4 in the embodiment 1 of the present invention.
Figure 10:
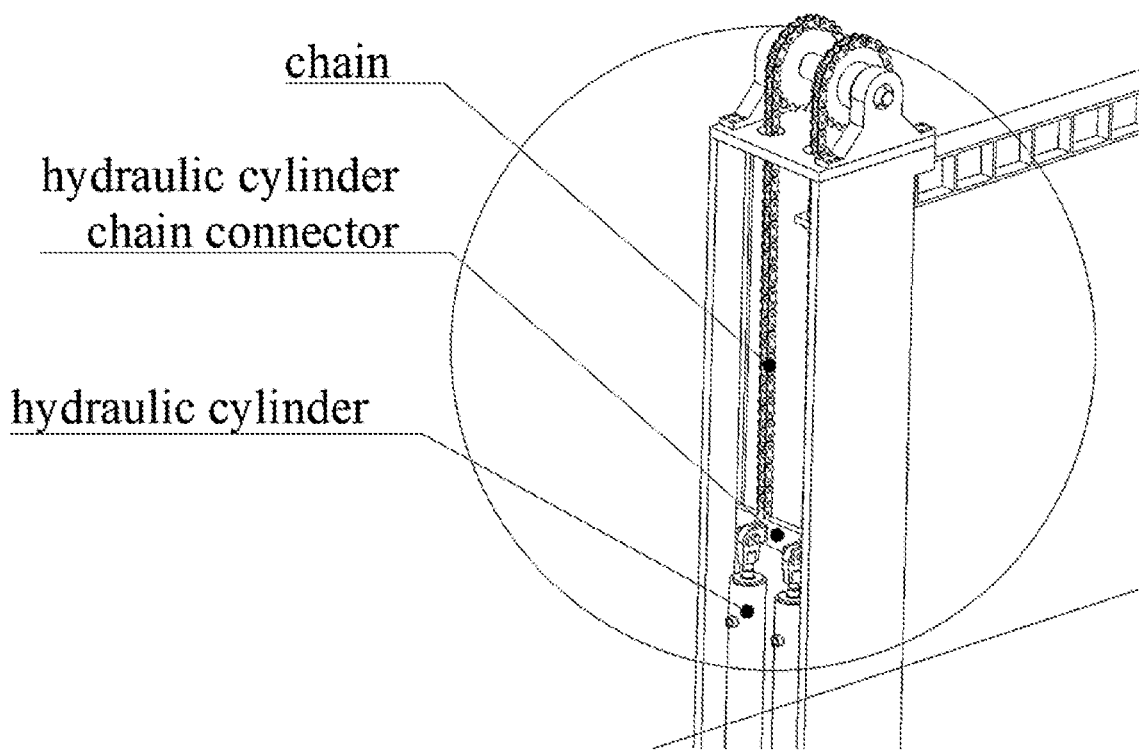
FIG. 10 is a schematic diagram of part A of the equipment for self-positioning handling of aluminum profiles for rail transit vehicle I in FIG. 1.
Figure 11:
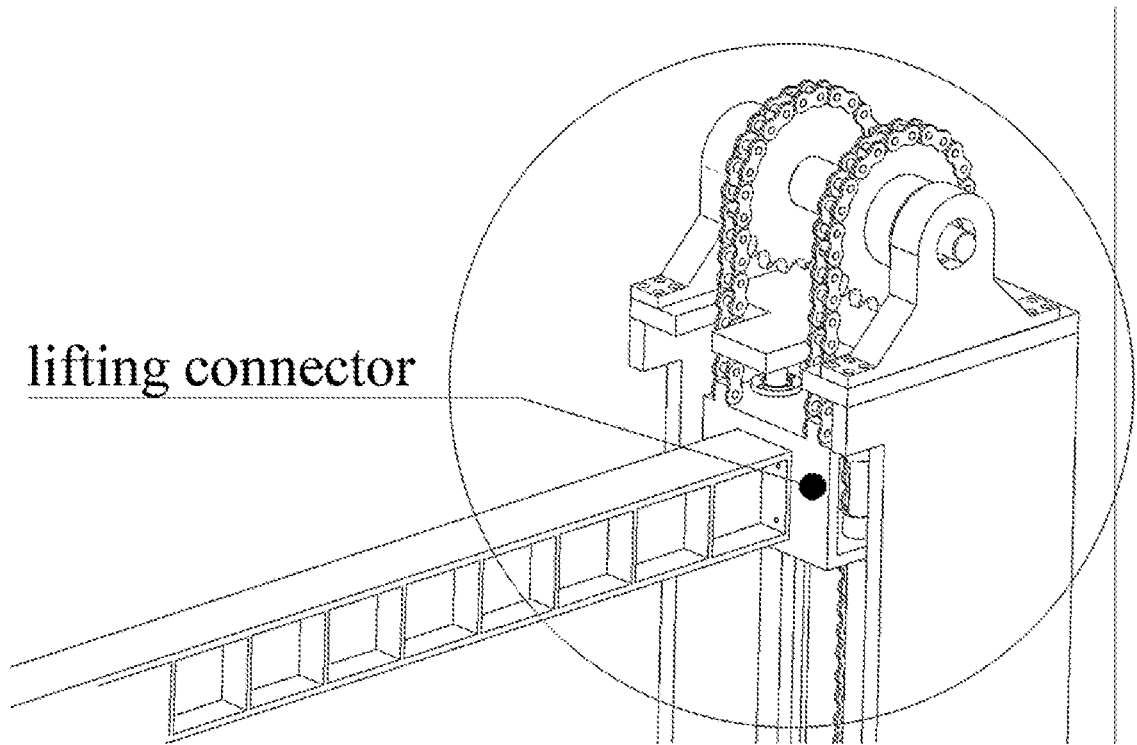
FIG. 11 is a schematic diagram of part B of the equipment for self-positioning handling of aluminum profiles for rail transit vehicle I in FIG. 1.
Figure 12:
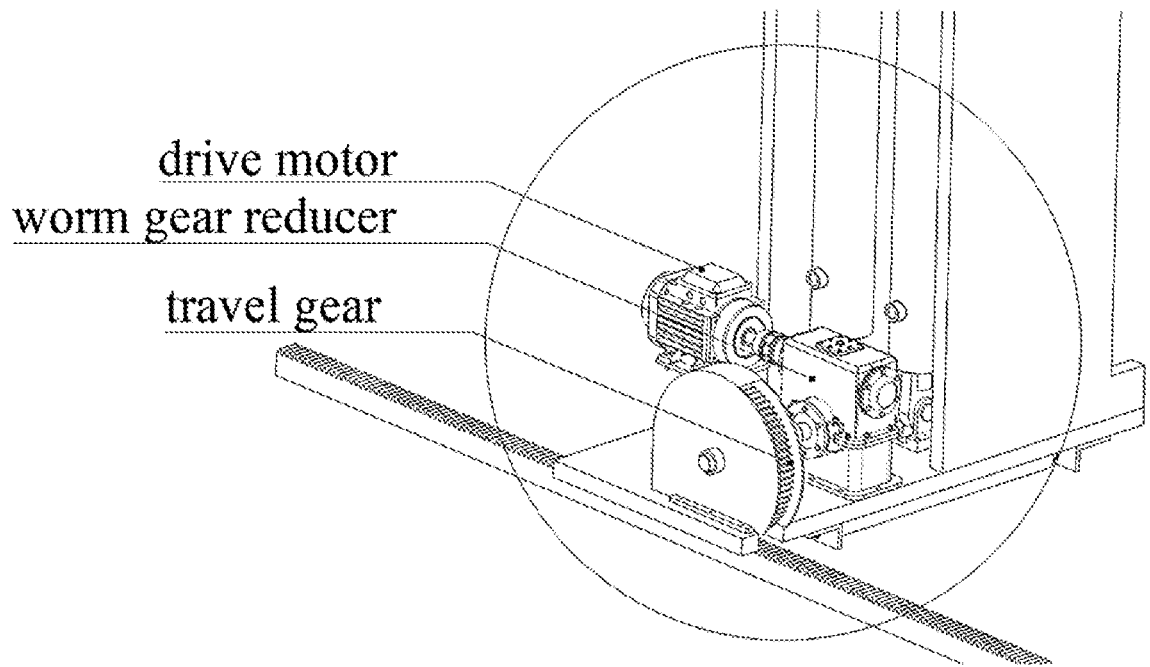
FIG. 12 is a schematic diagram of part C of the equipment for self-positioning handling of aluminum profiles for rail transit vehicle I in FIG. 1.

FIG. 9 shows a local cutaway view of the mechanical clamping jaw I-4; when the cylinder I-4-6 stops moving, the large clamping jaw I-4-8 is in a fixed position. At this time, the double-rod cylinders I-4-10, the connecting rods I-4-12 and the small clamping jaws I-4-11 constitute a slider linkage mechanism with the double-rod cylinder I-4-32 as the active member, so as to realize the adjustment of the angle of the small clamping jaw I-4-11, thus satisfying the clamping of two kinds of curved profiles, namely the upperside beam profiles and the window lower profiles. The rollers I-4-13 made of the nylon structure are mounted at the ends of the small clamping jaw I-4-11 for the purpose of preventing the rigid clamping jaw from damaging the surface of the profile when clamping the profile.

A working process of the handling equipment with the mechanical clamping jaws I-4 is as follows:

when the handling and lifting mechanism I-1 moves the material rack along the y-axis, an initial z-axis descent of the mechanical clamping jaws I-4 is first realized through the handling and lifting mechanism I-1, and then a precise z-axis descent of the mechanical clamping jaws I-4 is realized through the 2-DOF spatial mechanism I-3; after reaching the determined position, the mechanical clamping jaws I-4 mounted on the 2-DOF spatial mechanism I-3 are responsible for the gripping and clamping work of the aluminum alloy profile of the rail vehicle. First, according to the transverse width of the aluminum alloy profile of the rail vehicle, the cylinder I-4-12, in a first step of action, adjusts the clamping range of the large clamping jaw I-4-17; because the accuracy of transverse handling is limited, i.e. the moving accuracy on the y-axis of the handling and lifting mechanism I-1 is limited, the swing degrees of freedom on the x-axis of the mechanical clamping jaw I-4 mounted on the 2-DOF spatial mechanism I-3 can allow the existence of the errors on the direction of the y-axis and make a self-adaptation. Then, according to the type of profile as a flat profile or a curved profile, the angle of the small clamping jaws I-4-11 is thus adjusted by the double-rod cylinder I-4-10. Finally, the cylinder I-4-12 realizes a second step of action, i.e. the gripping and clamping of aluminum alloy profiles. Then a precise rise of the mechanical clamping jaws I-4 can be realized by the 2-DOF spatial mechanism I-3, and the rise of the handling and lifting mechanism I-1 on the z-axis thus can be realized, and finally the profiles can be horizontally handled and placed in the grinding station.

What is claimed is:

1. Equipment for self-positioning handling of aluminum profiles for rail vehicle, comprising a handling and lifting mechanism, a steel beam, two degrees of freedom (2-DOF) spatial mechanisms and mechanical clamping jaws; the steel beam is fixed on the handling and lifting mechanism and being driven to lift by the handling and lifting mechanism; the 2-DOF spatial mechanisms is fixed on the steel beam, comprising a cylinder supporting seat, four connecting members are arranged on an outer ring of the cylinder supporting seat, and the four connecting members being respectively hinged to four first connecting rods; wherein, two of the first connecting rods are hinged to first ends of two ball joint connecting rods, and second ends of the two ball joint connecting rods are hinged to a clamping jaw connecting seat; the other two first connecting rods are hinged to first ends of two second connecting rods, and second ends of the two second connecting rods are also hinged to the clamping jaw connecting seat; a cylinder is arranged at a center of the cylinder supporting seat, and a piston rod of the cylinder driving the clamping jaw connecting seat; the mechanical clamping jaw is fixed to the clamping jaw connecting seat;

wherein, the handling and lifting mechanism is connected to a hydraulic cylinder chain connector through a hydraulic cylinder, and the hydraulic cylinder chain connector is connected to a lifting connector through the chain.

2. The equipment for self-positioning handling of aluminum profiles for rail vehicle as claimed in claim 1, wherein the mechanical clamping jaw is a left-right symmetric structure, comprising a mounting base, large clamping jaws are hinged to both ends of the mounting base, a small clamping jaw is hinged at a first end of the large clamping jaw, a second end of the large clamping jaw being driven by a first cylinder fixed to the mounting base, and the small clamping jaw being driven by a second cylinder fixed to the large clamping jaw.

3. The equipment for self-positioning handling of aluminum profiles for rail vehicle as claimed in claim 2, wherein the small clamping jaw is V-like shape, and a through-hole is provided in a middle position of the small clamping jaw, a first connecting shaft passing through the through-holes to connect the small clamping jaws located on the same side of the mounting base in series; each of two clamping ends of the small clamping jaw is also provided with the through-hole, and the clamping ends of the small clamping jaws located on the same side of the mounting base are connected in series by a second connecting shafts; moreover, there are rollers mounted on the second connecting shafts.

4. The equipment for self-positioning handling of aluminum profiles for rail vehicle as claimed in claim 2, wherein the second cylinder is connected to a connecting rod, and the connecting rod driving the small clamping jaw.

5. The equipment for self-positioning handling of aluminum profiles for rail vehicle as claimed in claim 2, wherein two small clamping jaws are mounted at an end of each the large clamping jaw through the first connecting shaft.

6. The equipment for self-positioning handling of aluminum profiles for rail vehicle as claimed in claim 2, wherein two the large clamping jaws are mounted on the first side of the mounting base; top ends of the two large clamping jaws are connected together by a fixing member; a plurality of bulges are provided on the fixing member, each the bulge is provided with a through-hole, the plurality of the bulges are connected in series by a third connecting shaft; each the large clamping jaw being driven by a separate first cylinder correspondingly.

7. The equipment for self-positioning handling of aluminum profiles for rail vehicle as claimed in claim 6, wherein the mounting base comprises an upper cover plate and a base plate, a center of bottom end of the upper cover plate is provided with a cylinder, and shoulder blind holes are provided inside the cylinder; a central position of the base plate is cooperated with a shaft through a bearing, an upper part of the shaft is cooperated with the blind holes through a bearing, and a central part of the shaft is cooperated with a rotating member through a bearing, and a top surface of the rotating member is connected with two spherical members.

8. The equipment for self-positioning handling of aluminum profiles for rail vehicle as claimed in claim 7, wherein the spherical members are connected to the third connecting shaft by means of a retractable connecting rod.

9. The equipment for self-positioning handling of aluminum profiles for rail vehicle as claimed in claim 1, wherein the handling and lifting mechanism is connected to a worm gear reducer through a drive motor, and then the worm gear reducer is connected to a travel gear.

* * * * *